US012217246B2

(12) United States Patent
Ravinathan et al.

(10) Patent No.: US 12,217,246 B2
(45) Date of Patent: Feb. 4, 2025

(54) METHOD AND SYSTEM FOR USE OF AN EMV CARD IN A MULTI-SIGNATURE WALLET FOR CRYPTOCURRENCY TRANSACTIONS

(71) Applicant: MASTERCARD ASIA/PACIFIC PTE. LTD., Singapore (SG)

(72) Inventors: Srinath Ravinathan, Singapore (SG); Bensam Joyson, Singapore (SG); Donghao Huang, Singapore (SG); Teck Yong Tan, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

(21) Appl. No.: 16/840,566

(22) Filed: Apr. 6, 2020

(65) Prior Publication Data

US 2021/0312431 A1     Oct. 7, 2021

(51) Int. Cl.
*G06Q 20/36*     (2012.01)
*G06F 16/27*     (2019.01)
(Continued)

(52) U.S. Cl.
CPC ......... *G06Q 20/3678* (2013.01); *G06F 16/27* (2019.01); *G06Q 20/0658* (2013.01);
(Continued)

(58) Field of Classification Search
USPC .......................................................... 705/69
See application file for complete search history.

(56) References Cited

U.S. PATENT DOCUMENTS 6,061,791 A  *  5/2000  Moreau ................. H04L 9/0841
                                              380/283
2014/0188736 A1*  7/2014  Luzzatto ............. G06Q 20/401
                                              705/69
(Continued)

FOREIGN PATENT DOCUMENTS

CN    110166237 A     8/2019
CN    111325546 A     6/2020
(Continued)

OTHER PUBLICATIONS

Fombad, T., "The Emergence of Cryptocurrency and the Attendant Tax Implications", ProQuest Dissertations & Theses. (2018) (Year: 2018).*

(Continued)

*Primary Examiner* — Clay C Lee
(74) *Attorney, Agent, or Firm* — Panitch Schwarze Belisario & Nadel LLP

(57) ABSTRACT

A method for carrying out a cryptocurrency blockchain transaction through an integrated circuit payment card using a multi-signature blockchain wallet includes: storing, in an integrated circuit of a payment card, a first private key of a first cryptographic key pair and a transaction account number; receiving, by the integrated circuit, a blockchain transaction from a point of sale device, the blockchain transaction including unspent transaction outputs, destination addresses, a cryptocurrency amount for each destination address, and a first digital signature generated using a second private key of a second cryptographic key pair; digitally signing, by the integrated circuit, the blockchain transaction using the first private key to generate a second digital signature; and transmitting, by the integrated circuit, the digitally signed blockchain transaction including the first digital signature and the second digital signature to the point of sale device.

16 Claims, 6 Drawing Sheets

(51) Int. Cl.
*G06Q 20/06* (2012.01)
*G06Q 20/20* (2012.01)
*G06Q 20/34* (2012.01)
*G06Q 20/38* (2012.01)

(52) U.S. Cl.
CPC ......... *G06Q 20/202* (2013.01); *G06Q 20/341* (2013.01); *G06Q 20/3825* (2013.01); *G06Q 20/3829* (2013.01); *G06Q 2220/10* (2013.01)

(56) References Cited

U.S. PATENT DOCUMENTS

| | | | |
|---|---|---|---|
| 2015/0227922 A1* | 8/2015 | Filler | H04L 9/00 705/41 |
| 2016/0253663 A1 | 9/2016 | Clark et al. | |
| 2017/0161734 A1* | 6/2017 | Bankston | G06Q 20/3829 |
| 2017/0236121 A1* | 8/2017 | Lyons | G06Q 20/06 705/71 |
| 2017/0317833 A1* | 11/2017 | Smith | H04L 63/0442 |
| 2018/0189781 A1 | 7/2018 | McCann et al. | |
| 2018/0240107 A1 | 8/2018 | Andrade | |
| 2018/0276666 A1* | 9/2018 | Haldenby | G06Q 20/02 |
| 2019/0052461 A1* | 2/2019 | Kreder, III | G06Q 20/065 |
| 2019/0180275 A1 | 6/2019 | Safak | |
| 2019/0392439 A1* | 12/2019 | Perullo | G06Q 20/3825 |
| 2020/0027084 A1 | 1/2020 | Groarke et al. | |
| 2020/0082388 A1 | 3/2020 | Wang et al. | |
| 2020/0186568 A1* | 6/2020 | Erb | G06Q 20/3674 |
| 2020/0242573 A1* | 7/2020 | Naqvi | G06Q 20/02 |
| 2020/0364686 A1* | 11/2020 | Millius | G06Q 20/322 |
| 2021/0119807 A1* | 4/2021 | Chen | H04L 9/3297 |

FOREIGN PATENT DOCUMENTS

| | | | | |
|---|---|---|---|---|
| WO | WO-2004034202 A2 * | 4/2004 | ......... G06F 21/6218 |
| WO | 2015183497 A1 | 12/2015 | |
| WO | WO-2015180578 A1 * | 12/2015 | ............ G06Q 20/40 |
| WO | 2019020824 A1 | 1/2019 | |
| WO | 2019218055 A1 | 11/2019 | |

OTHER PUBLICATIONS

International Search Report (Form PCT/ISA/210) issued May 6, 2021, by the Intellectual Property Office of Singapore In corresponding International Application No. PCT/SG2021/050120. (4 pages).

Extended European Search Report, dated Dec. 13, 2023, issued in corresponding European Application No. 21784280.6-1218, 10 pgs.

Invitation to Respond to Written Opinion, dated Mar. 26, 2024, issued in corresponding Singapore Application No. 11202252449T, 10 pages.

Notice of Reasons for Refusal with Eng. Translation, issued on Nov. 12, 2024, in corresponding Japanese Application No. 2022-560988, 9 pages.

* cited by examiner

METHOD AND SYSTEM FOR USE OF AN EMV CARD IN A MULTI-SIGNATURE WALLET FOR CRYPTOCURRENCY TRANSACTIONS

FIELD

The present disclosure relates to carrying out a cryptocurrency blockchain transaction through an integrated circuit payment card using a multi-signature blockchain wallet, specifically a transaction system where a blockchain transaction is conducted using a traditional point of sale system where the transaction is funded via a multi-signature wallet that utilizes signatures from an issuing financial institution and the payment card itself.

BACKGROUND

Cryptographic currencies that utilize a blockchain for the processing thereof are gaining popularity due to a number of benefits that can be provided by a blockchain. Some of the benefits include immutability, where a transaction that is conducted cannot be changed as the blockchain continues to add new blocks, which provides for a clear and unchangeable record of transactions that aids in auditing and can help prevent fraud. Another advantage is anonymity where, even if the blockchain itself is public, the identity of the transacting parties is unknown.

However, blockchains currently require participants to utilize computing devices that have electronic wallets stored thereon for participating in a blockchain transaction as a sender or recipient. Such devices may be unavailable to many consumers, thus limiting the adoption and availability of the associated cryptocurrency, which may discourage some potential participants, and cascading accordingly. In addition, the unfamiliarity of the process for consumers that are used to using a bank-issued payment card may discourage some consumers from adopting cryptocurrencies for transacting. Thus, there is a need for a system that enables consumers to utilize a familiar and trusted system to conduct cryptocurrency transactions in a blockchain in a manner for which consumers are already comfortable.

SUMMARY

The present disclosure provides a description of systems and methods for carrying out a cryptocurrency blockchain transaction through an integrated circuit payment card using a multi-signature blockchain wallet. A traditional payment card processing system is used to conduct a blockchain transaction where a multi-signature wallet is used to fund the blockchain transaction. The multi-signature wallet requires signatures of both the integrated circuit payment card as well as the issuing institution that issued the payment card to the consumer. The transaction is initiated at a point of sale and follows traditional processes until the authorization request reaches the issuer, at which time the issuer can digitally sign a blockchain transaction to return with the authorization response, for payment via a cryptocurrency in place of a traditional fiat currency. The signed blockchain transaction is transmitted to the integrated circuit payment card by the point of sale, which can then apply its own digital signature, satisfying the multi-signature requirement for the blockchain wallet. The twice-signed blockchain transaction is forwarded on to the merchant's acquirer by the point of sale, where the acquirer submits the blockchain transaction to the blockchain network for processing. The result is a familiar process for the consumer using familiar equipment, but where the transaction is funded via a cryptocurrency. Use of the acquirer to submit the transaction means that a legacy point of sale can perform the functions discussed herein with minimal modification, resulting in fast and easy adoption in existing systems to facilitate payments via cryptocurrency.

A method for carrying out a cryptocurrency blockchain transaction through an integrated circuit payment card using a multi-signature blockchain wallet includes: storing, in a memory of an integrated circuit of a payment card, at least a first private key of a first cryptographic key pair and a transaction account number; receiving, by a receiver of the integrated circuit, a blockchain transaction from a point of sale device, where the blockchain transaction includes at least one or more unspent transaction outputs, one or more destination addresses, a cryptocurrency amount for each of the one or more destination addresses, and a first digital signature generated using a second private key of a second cryptographic key pair; digitally signing, by a processor of the integrated circuit, the blockchain transaction using the first private key to generate a second digital signature; and transmitting, by a transmitter of the integrated circuit, the digitally signed blockchain transaction including the first digital signature and the second digital signature to the point of sale device.

A system for carrying out a cryptocurrency blockchain transaction through an integrated circuit payment card using a multi-signature blockchain wallet includes: a point of sale device; and a payment card having an integrated circuit, wherein the integrated circuit includes a memory storing at least a first private key of a first cryptographic key pair and a transaction account number, a receiver receiving a blockchain transaction from the point of sale device, where the blockchain transaction includes at least one or more unspent transaction outputs, one or more destination addresses, a cryptocurrency amount for each of the one or more destination addresses, and a first digital signature generated using a second private key of a second cryptographic key pair; a processor digitally signing the blockchain transaction using the first private key to generate a second digital signature, and a transmitter transmitting the digitally signed blockchain transaction including the first digital signature and the second digital signature to the point of sale device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
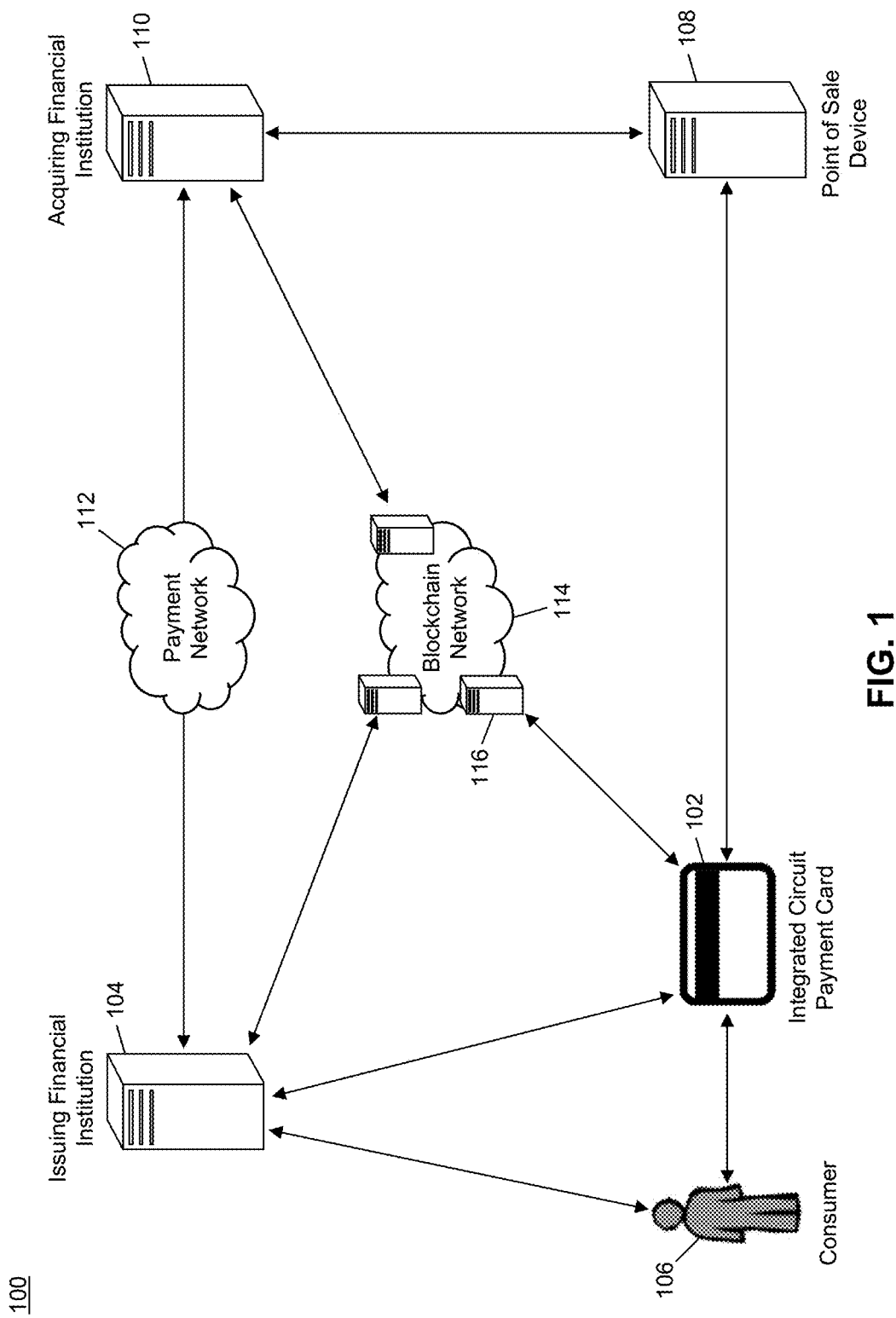
FIG. 1 is a block diagram illustrating a high-level system architecture for carrying out cryptocurrency transactions through an integrated circuit payment card in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain-A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network-A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated transaction account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Cryptocurrency Blockchain Transactions

FIG. 1 illustrates a system 100 for carrying out cryptocurrency blockchain transactions using an integrated circuit payment card 102 and a traditional transaction processing system via use of a multi-signature blockchain wallet.

The system 100 may include an integrated circuit payment card 102. The integrated circuit payment card 102, discussed in more detail below, may be a payment card issued by an issuing financial institution 104 that includes an integrated circuit for performing the functions discussed herein. In an exemplary embodiment, the integrated circuit payment card 102 may be configured to comply with the EMV standards, as is known in the art. The issuing financial institution 104 may be an entity that issues transaction accounts for use in funding electronic payment transactions. In the system 100, a consumer 106 may have a transaction account issued thereto by the issuing financial institution 104. As part of the issuing of the transaction account, the issuing financial institution 104 may issue the integrated circuit payment card 102 to the consumer 106, where the integrated circuit payment card 102 has account data stored therein for the transaction account for use in conducting electronic payment transactions that are to be funded with the transaction account. The transaction data may include, for instance, a payment account number or transaction account number, an expiration date, a name, a security code, application cryptograms, application transaction counters, etc.

Figure 5:
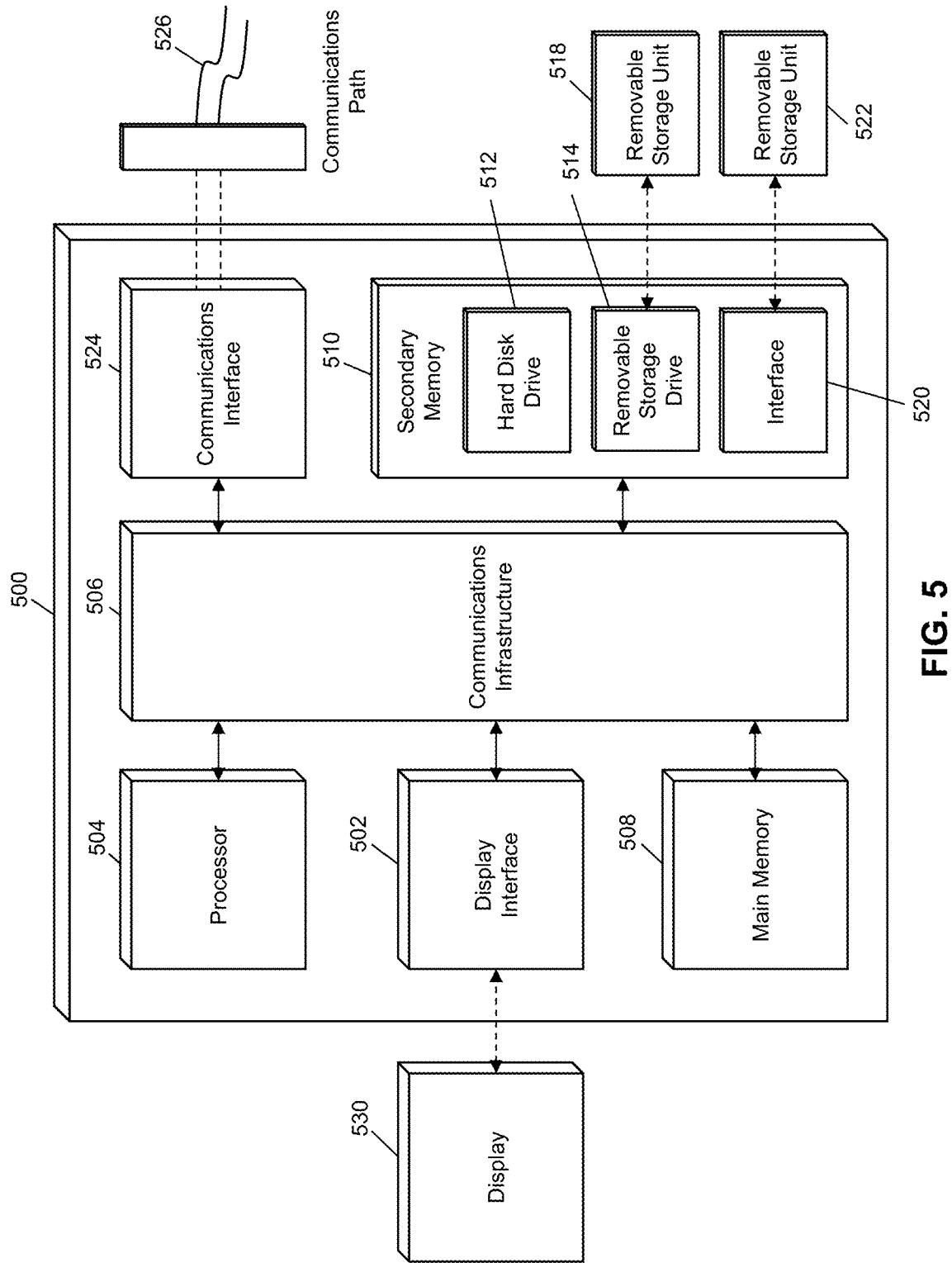
FIG. 5 is a block diagram illustrating a computer system architecture in accordance with exemplary embodiments.

In the system 100, the consumer 106 may have a desire to use a cryptocurrency to fund electronic payment transactions, where the cryptocurrency may be processed and held via the use of a blockchain, as an alternative to the use of a fiat currency in a traditional payment transaction that is processed using a payment card processing network, such as the payment network 112 illustrated in FIG. 1. In the system 100, the blockchain may be managed and otherwise operated by a blockchain network 114. The blockchain network 114 may be comprised of a plurality of blockchain nodes 116. Each blockchain node 116 may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 114 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 114 using the public key of the cryptographic key pair. In some cases, the term "blockchain wallet" may refer specifically to the private key. In other cases, the term "blockchain wallet" may refer to a computing device (e.g., integrated circuit payment card 102, issuing financial institution 104, point of sale device 108, acquiring financial institution 110) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., integrated circuit payment card 102) that is generated using the sender's private key, a blockchain address of the recipient of currency (e.g., point of sale device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 116 in the blockchain network 114, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 114 before being added to the blockchain and distributed to all of the blockchain nodes 116 in the blockchain network 118 in traditional blockchain implementations. In cases where a blockchain data value may not be related to a blockchain transaction, but instead the storage of other types of data, blockchain data values may still include or otherwise involve the validation of a digital signature.

In the system 100, the consumer 106 may be issued a multi-signature blockchain wallet for use in conducting cryptocurrency transactions on the blockchain. A multi-signature wallet may be a blockchain wallet where multiple digital signatures must be collected and validated for a blockchain transaction to be funded by the blockchain wallet. In the system 100, the integrated circuit payment card 102 may include a first cryptographic key pair for the blockchain wallet, while the issuing financial institution 104 may include a second cryptographic key pair for the blockchain wallet. In order to fund a cryptocurrency blockchain transaction with the blockchain wallet, the integrated circuit payment card 102 and the issuing financial institution 104 must both provide their digital signatures using the private keys of their respective cryptographic key pairs.

When the consumer 106 wants to participate in an electronic payment transaction, they may present their integrated circuit payment card 102 to a point of sale device 108 of a merchant for payment. The point of sale device 108 may read the account data from the integrated circuit payment card 102 using any suitable method, such as via near field communication, a physical connection between the integrated circuit and contacts in the point of sale device 108, etc. The point of sale device 108 may receive the account data, including the payment account number, and transmit the account data as well as additional transaction data to an acquiring financial institution 110 using a suitable communication network and method. The additional transaction data may include any data used in the processing of an electronic payment transaction, such as a transaction time, transaction date, merchant identifier, currency amount, point of sale identifier, loyalty data, offer data, reward data, etc.

If the merchant does not accept payment via the cryptocurrency, then the electronic payment transaction may be processed using traditional methods and systems. In such instances, the acquiring financial institution 110 may submit an authorization request for the transaction to a payment network 112 using payment rails thereof, which may forward the authorization request to the issuing financial institution 104 (e.g., identified via the payment account number). The issuing financial institution 104 can approve or deny the transaction (e.g., based on the transaction amount and an available balance or credit limit for the transaction account associated with the payment account number) and return an authorization response to the payment network 112 for forwarding to the acquiring financial institution 110. The acquiring financial institution 110 provides a notification to the point of sale device 108 regarding the approval or denial of the payment transaction, and the merchant and consumer 106 finish the transaction accordingly.

If the merchant accepts payment via the cryptocurrency, then the consumer 106 may indicate as such to the merchant. The point of sale device 108 may be input with data indicating that cryptocurrency is to be used to fund the electronic payment transaction, such as may be input by a user thereof (e.g., an employee of the merchant) or the consumer 106, such as through an input device of the point of sale device 108, a separate computing device (e.g., a smart phone with an application program in communication with the integrated circuit payment card 102), or a physical switch on the integrated circuit payment card 102. The transaction data submitted to the acquiring financial institution 110 may include a currency code that indicates that the cryptocurrency is being used. In some cases, the merchant may accept multiple, different cryptocurrencies. In such cases, each cryptocurrency may have its own currency code. In some embodiments, the point of sale device 108 may have an alternative application program stored thereon that may be executed when payment is to be made via cryptocurrency, as an alternative to a default application program used for electronic payment transactions funded via a fiat currency using a traditional transaction account.

The acquiring financial institution 110 may receive the transaction data from the point of sale device 108, as well as the currency code (e.g., or other data, such as transmitted via the alternative application program) indicating payment is to be received via the specified cryptocurrency. The acquiring financial institution 110 may generate an authorization request for the transaction. The authorization request may be a transaction message, which is a specially formatted data message that is formatted pursuant to one or more standards governing the exchange of financial transaction messages, such as the International Organization of Standardization's ISO 8583 or ISO 20022 standards. An authorization request may be a transaction message that includes a message type indicator that indicates an authorization request. The authorization request may include the account data and other transaction data received from the point of sale device 108, including the currency code indicating that the consumer 106 is to pay for the transaction using cryptocurrency.

The authorization request may be submitted to the payment network 112 using payment rails associated therewith by the acquiring financial institution 110. The payment network 112 may perform any processing functions (e.g., fraud scoring, account mapping, etc.) and route the authorization request to the issuing financial institution 104 via the payment rails. The issuing financial institution 104 may be identified via the payment account number. For instance, a portion of the payment account number may be a bank identification number that is used to identify the issuing financial institution 104 for routing of transaction messages.

The issuing financial institution 104 may receive the authorization request and may identify that a cryptocurrency is to be used to fund the transaction based on the currency code stored in an appropriate data element in the authorization request. The issuing financial institution 104 may identify an account profile for the consumer's transaction account using the payment account number stored in an appropriate data element in the authorization request and identify the private key of the second cryptographic key pair for the consumer's blockchain wallet. The issuing financial institution 104 may then generate a digital signature for the blockchain transaction using the private key.

In some embodiments, the issuing financial institution 104 may be configured to generate the blockchain transaction. In such embodiments, the point of sale device 108 or acquiring financial institution 110 may identify a destination address for a blockchain wallet to be used to receive payment for the cryptocurrency transaction, such as by generating such an address using a public key of the cryptographic key pair for the blockchain wallet, which may be stored in the point of sale device 108 or the acquiring financial institution 110, as applicable. A cryptocurrency amount equivalent to the transaction amount in the authorization request may also be identified by the point of sale device 108, acquiring financial institution 110, or issuing financial institution 104, if applicable. The issuing financial institution 104 may identify suitable unspent transaction outputs in the consumer's account profile and generate the blockchain transaction to include the unspent transaction output(s), destination addresses (e.g., for the merchant and any additional addresses, such as one to retain change for the transaction if the amounts for the unspent transaction outputs exceeds the cryptocurrency amount to be paid to the merchant), and the cryptocurrency amount to be transferred to each destination address. The issuing financial institution 104 may then digitally sign the blockchain transaction directly. In other embodiments, the blockchain transaction may be generated by another system, as discussed below.

The issuing financial institution 104 may generate an authorization response for the electronic payment transaction, where the authorization response may be a formatted transaction message that includes a message type indicator that indicates that the transaction message is an authorization response. The authorization response may include the transaction data from the authorization request as well as a response code indicating that the transaction is approved, and a data element that stores the issuer's digital signature (e.g., and other blockchain data, such as the blockchain transaction, if applicable). In some cases, the data element that stores the blockchain data may be reserved for private use in the applicable standard(s).

The authorization response may be submitted to the payment network 112 by the issuing financial institution 104 using the payment rails associated therewith. The payment network 112 may perform any additional processing as necessary and forward the authorization response to the acquiring financial institution 110. The acquiring financial institution 110 may transmit the authorization response or a notification message related thereto to the point of sale device 108 indicating approval of the transaction by the issuing financial institution 104, as well as the issuer's digital signature.

The point of sale device 108 may electronically transmit the issuer's digital signature to the integrated circuit payment card 102 using the communication channel between the point of sale device 108 and integrated circuit payment card 102. The integrated circuit payment card 102 may then generate its own digital signature using its own private key for the blockchain wallet. In some cases, the integrated circuit payment card 102 may first validate the issuer's digital signature using a public key of the issuer's cryptographic key pair. For instance, the integrated circuit payment card 102 may store the public key, which may be provided during issuance of the integrated circuit payment card 102 and used to validate the digital signature. In such cases, the integrated circuit payment card 102 may prevent generation of the second digital signature and halt processing of the payment transaction if the issuer's digital signature is invalid, such as to prevent potential fraud.

In some instances, the blockchain transaction may be generated by the integrated circuit payment card 102. In such instances, the point of sale device 108 may provide the destination address and any other blockchain transaction data to the integrated circuit payment card 102 along with the issuer's digital signature. The integrated circuit payment card 102 may then generate the blockchain transaction using the received blockchain data and data stored therein, such as unspent transaction outputs and cryptocurrency amounts, which can be digitally signed using the private key of the first cryptographic key pair. In other instances, the acquiring financial institution 110 or point of sale device 108 may generate the blockchain transaction. In such instances, the unspent transaction outputs may be supplied by the issuing financial institution 104 (e.g., in the authorization response) or the integrated circuit payment card 102 (e.g., with the payment account number before the authorization request is submitted or with the second digital signature).

Once the integrated circuit payment card 102 has generated the second digital signature using its private key, the digital signature may be transmitted to the point of sale device 108 using the communication channel established between the integrated circuit payment card 102 and the point of sale device 108. The point of sale device 108 may then forward the two digital signatures and other blockchain data to the acquiring financial institution 110 using a suitable communication network and method. The acquiring financial institution 110 may submit the twice-signed blockchain transaction to a blockchain node 116 in the blockchain network 114 using a suitable communication network and method.

The blockchain node 116 may confirm the blockchain transaction, such as by validating both digital signatures using the appropriate public keys, ensuring that the unspent transaction outputs are associated with the multi-signature wallet and have not been previously used, and that the cryptocurrency amount(s) being transferred are covered by the amounts previously sent to the unspent transaction outputs. The confirmed blockchain transaction may be included in a new block that is generated by the blockchain node 116 (e.g., or other blockchain node 116 in the blockchain network 114), confirmed by other blockchain nodes 116, and then added to the blockchain using traditional processes. In some embodiments, a blockchain node 116 may provide a confirmation of receipt, confirmation, and/or addition of the blockchain transaction to the blockchain to the acquiring financial institution 110, which the acquiring financial institution 110 may use to provide notifications to the point of sale device 108 and/or issuing financial institution 104. The blockchain transaction may result in payment from the consumer 106 to the merchant via cryptocurrency, where the transaction is initiated at a point of sale device 108 utilizing the integrated circuit payment card 102.

The methods and systems discussed herein enable the consumer 106 to utilize a familiar object, the integrated circuit payment card 102, in a familiar process to pay for an electronic payment transaction using a cryptocurrency. The consumer 106 can present their integrated circuit payment card 102 to a point of sale device 108 as in traditional fiat-based transactions and have payment accomplished using cryptocurrency, without having to learn new processes. In addition, the point of sale device 108 can accommodate the blockchain transaction through minimal modification, such as by simply adding a new currency code that is used for the cryptocurrency. Furthermore, by using a multi-signature wallet, the issuing financial institution 104 may still have oversight for the transaction, and can thereby provide the consumer 106 with valued services that the consumer 106 may already utilize for their fiat transaction account. Thus, cryptocurrency blockchain transactions are integrated into traditional processing methods with minimal intrusion for consumers 106 and point of sale devices 108, enabling consumers 106 to take advantage of cryptocurrency payments in a familiar setting.

Integrated Circuit Payment Card

Figure 2:
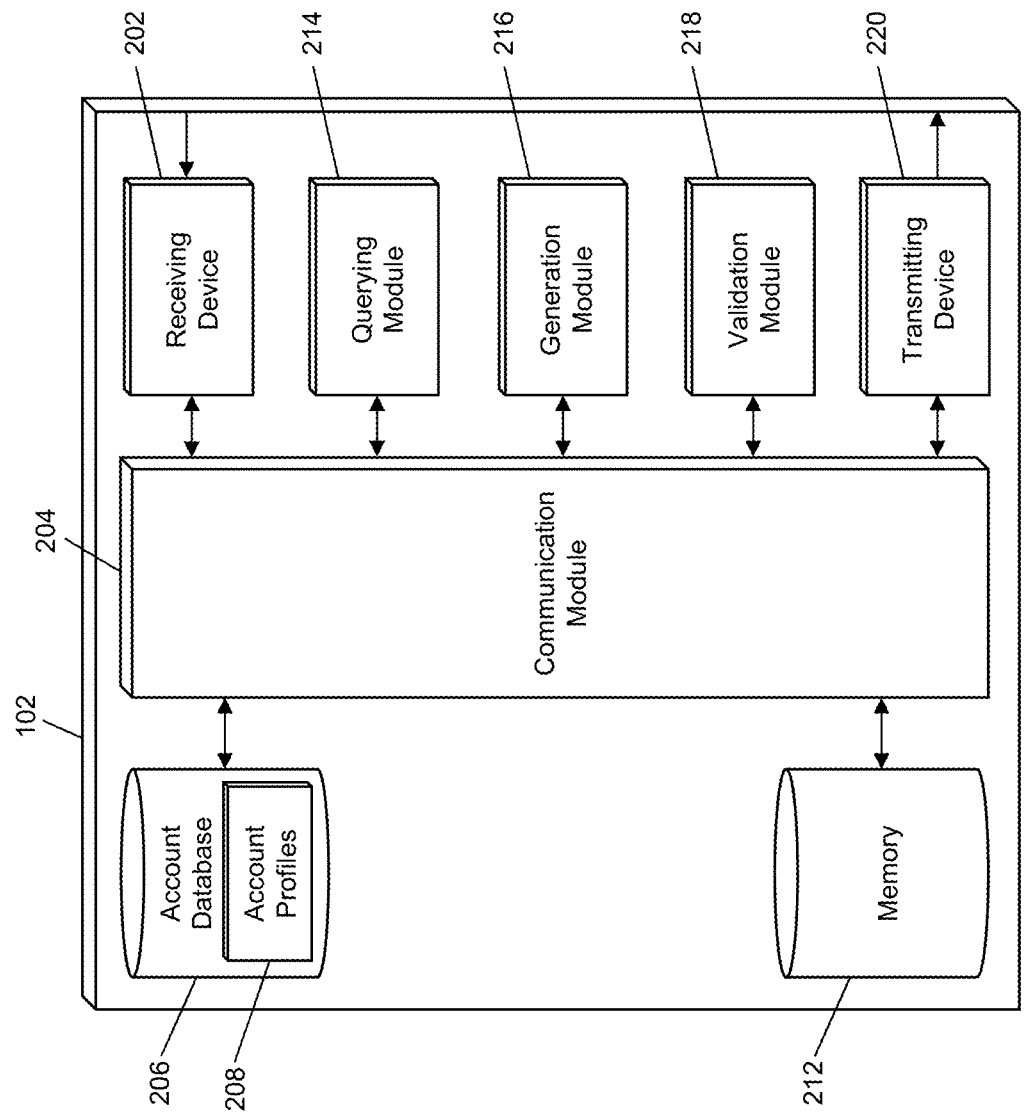
FIG. 2 is a block diagram illustrating the integrated circuit payment card of the system of FIG. 1 for carrying out cryptocurrency blockchain transactions in accordance with exemplary embodiments.

FIG. 2 illustrates an embodiment of the integrated circuit payment card 102 in the system 100. It will be apparent to persons having skill in the relevant art that the embodiment of the integrated circuit payment card 102 illustrated in FIG. 2 is provided as illustration only and may not be exhaustive to all possible configurations of the integrated circuit payment card 102 suitable for performing the functions as discussed herein. For example, the computer system 500 illustrated in FIG. 5 and discussed in more detail below may be a suitable configuration of the integrated circuit payment card 102.

The integrated circuit payment card 102 may include a receiving device 202. The receiving device 202 may be configured to receive data over one or more networks via one or more network protocols. In some instances, the receiving device 202 may be configured to receive data from issuing financial institutions 104, point of sale devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing financial institutions 104, which may be superimposed or otherwise encoded with account data, unspent transaction outputs, cryptocurrency amounts, public keys, and other data for use in performing the functions discussed herein. The receiving device 202 may also be configured to receive data signals electronically transmitted by point of sale devices 108 that may be superimposed or otherwise encoded with transaction requests for account data, issuer digital signatures, blockchain transactions or other blockchain data, transaction data, etc.

The integrated circuit payment card 102 may also include a communication module 204. The communication module 204 may be configured to transmit data between modules, engines, databases, memories, and other components of the integrated circuit payment card 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the integrated circuit payment card 102 and external components of the integrated circuit payment card 102, such as externally connected databases, display devices, input devices, etc. The integrated circuit payment card 102 may also include a processing device. The processing device may be configured to perform the functions of the integrated circuit payment card 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may include an account database 206. The account database 206 may be configured to store one or more account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a transaction account for which the integrated circuit payment card 102 may be used to fund an electronic payment transaction, and may include data based thereon. For instance, an account profile 208 may include a payment account number for a fiat-based transaction account as well as a private key for a cryptographic key pair used when cryptocurrency is used to fund transactions initiated for that transaction account and any other additional data, such as unspent transaction outputs, cryptocurrency amounts, a public key of the issuing financial institution's cryptographic key pair, an application transaction counter, application cryptograms, etc.

The integrated circuit payment card 102 may also include a memory 212. The memory 212 may be configured to store data for use by the integrated circuit payment card 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the integrated circuit payment card 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, account profiles 208, currency conversion data, standard data, communication protocols, signature generation algorithms, etc.

The integrated circuit payment card 102 may include a querying module 214. The querying module 214 may be configured to execute queries on databases to identify information. The querying module 214 may receive one or more data values or query strings, and may execute a query string based thereon on an indicated database, such as the memory 212 of the integrated circuit payment card 102 to identify information stored therein. The querying module 214 may then output the identified information to an appropriate engine or module of the integrated circuit payment card 102 as necessary. The querying module 214 may, for example, execute a query on the account database 206 to identify an account profile 208 for the use of data stored therein for an electronic payment transaction.

The integrated circuit payment card 102 may also include a generation module 216. The generation module 216 may be configured to generate data for use by the integrated circuit payment card 102 in performing the functions discussed herein. The generation module 216 may receive instructions as input, may generate data based on the instructions, and may output the generated data to one or more modules of the integrated circuit payment card 102. For example, the generation module 216 may be configured to generate blockchain transactions, digital signatures, and other transactional data for use in performing the functions discussed herein.

The integrated circuit payment card 102 may also include a validation module 218. The validation module 218 may be configured to perform validations for the integrated circuit payment card 102 as part of the functions discussed herein. The validation module 218 may receive instructions as input, which may also include data to be used in performing a validation, may perform a validation as requested, and may output a result of the validation to another module or engine of the integrated circuit payment card 102. The validation module 218 may, for example, be configured to validate digital signatures using public keys of cryptographic key pairs, validate cryptocurrency amounts using transaction amounts and currency conversion data, etc.

The integrated circuit payment card 102 may also include a transmitting device 220. The transmitting device 220 may be configured to transmit data over one or more networks via one or more network protocols. In some instances, the transmitting device 220 may be configured to transmit data to issuing financial institutions 104, point of sale devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to issuing financial institutions 104, which may be superimposed or otherwise encoded with requests for public keys, requests for transaction data, transaction data for conducted payment transactions, unspent transaction outputs, cryptocurrency amounts, etc. The transmitting device 220 may also be configured to electronically transmit data signals to point of sale devices 108 that may be superimposed or otherwise encoded with payment account numbers and other transaction data, digital signatures, blockchain data, and other data as discussed herein.

Figure 3A:
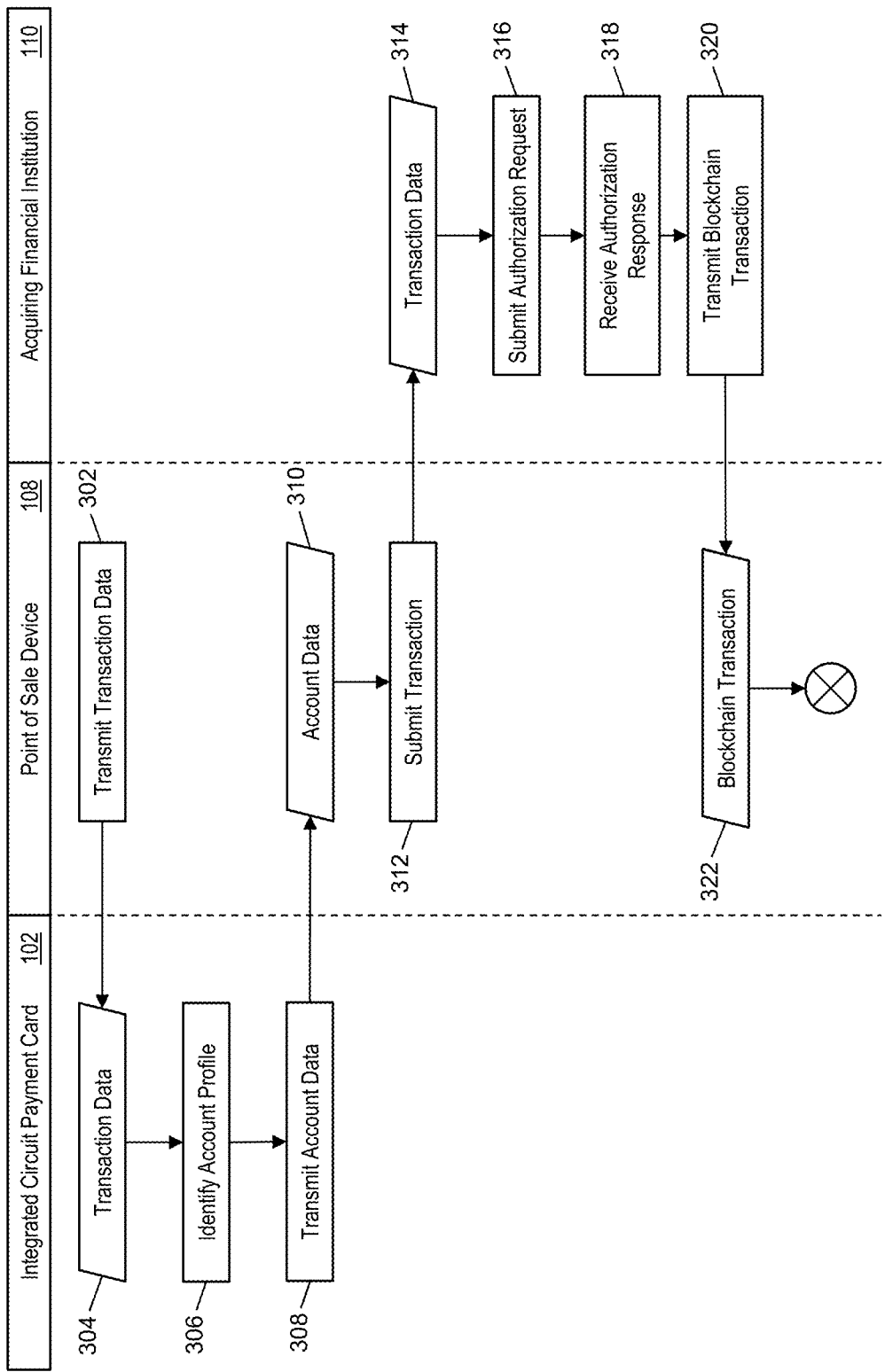
FIGS. 3A and 3B are a process flow illustrating a process for carrying out a cryptocurrency transaction using an integrated circuit card and point of sale device in accordance with exemplary embodiments.
Figure 3B:
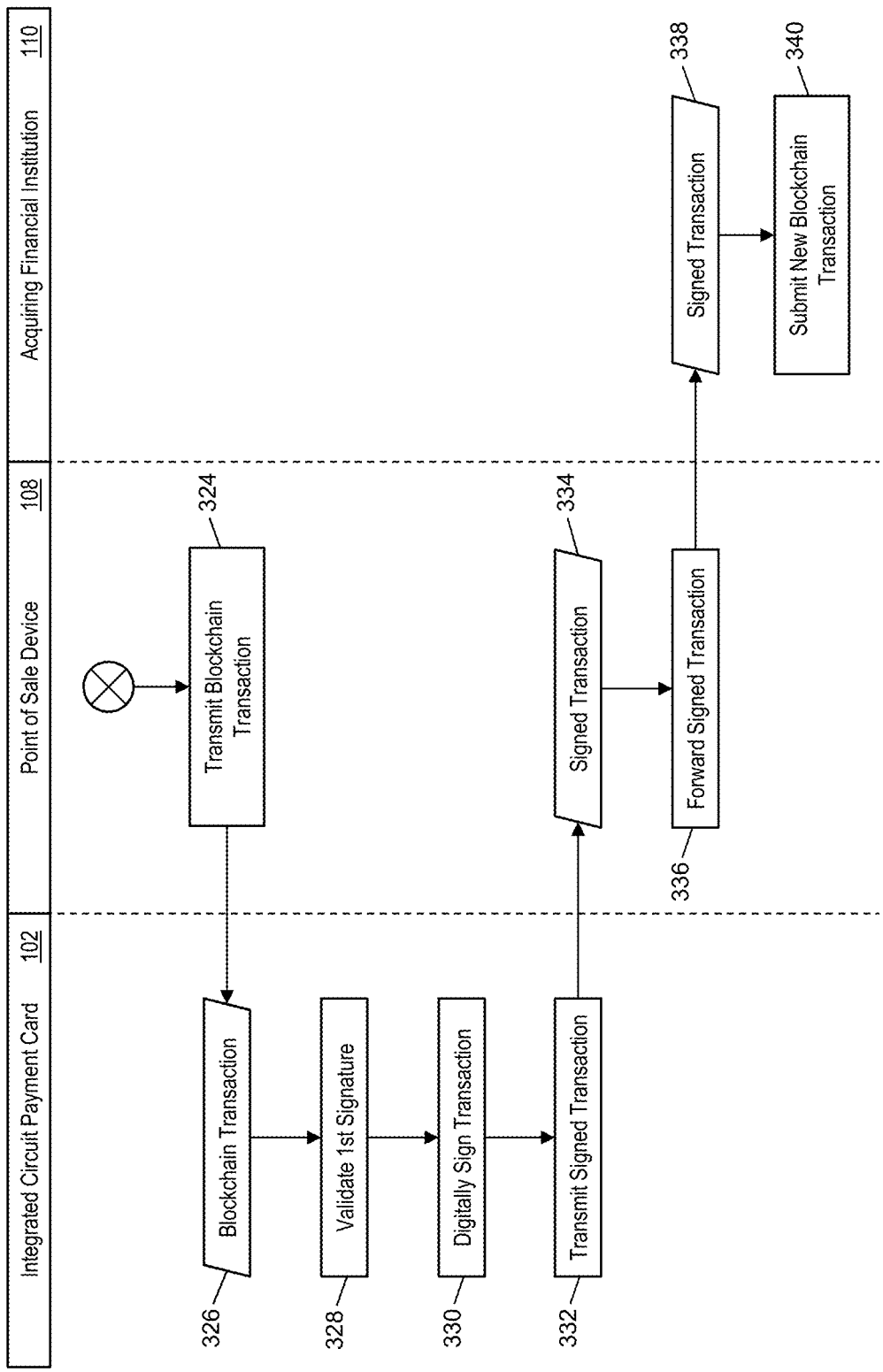

Process for Cryptocurrency Blockchain Transactions Using Traditional Payment Systems FIGS. 3A and 3B illustrate a process for processing a payment transaction initiated using a traditional payment system that is funded via a cryptocurrency blockchain transaction using a multi-signature blockchain wallet, such as may be performed in the system 100 illustrated in FIG. 1 and discussed above.

In step 302, the point of sale device 108 may electronically transmit transaction data for an electronic payment transaction to the integrated circuit payment card 102 using a communication channel established therewith using any suitable communication network and method. The transaction data may include, for instance, a transaction amount, transaction identifier, etc. In step 304, the receiving device 202 of the integrated circuit payment card 102 may receive the transaction data. In step 306, the querying module 214 of the integrated circuit payment card 102 may execute a query on the account database 206 of the integrated circuit payment card 102 to identify an account profile 208 stored therein related to a transaction account to be used to fund the electronic payment transaction and a payment account number and any other account data stored therein.

In step 308, the transmitting device 220 of the integrated circuit payment card 102 may electronically transmit the payment account number and other transaction data to the point of sale device 108 using the communication channel. In step 310, the point of sale device 108 may receive the account data and the payment account number from the integrated circuit payment card 102. In step 312, the point of sale device 108 may submit the electronic payment transaction to the acquiring financial institution 110 for processing. The electronic payment transaction may include the payment account number and other account data, an indication that payment via cryptocurrency is desired, and transaction data. The transaction data may include any other data needed for processing of the payment transaction, such as a transaction time, transaction date, merchant identifier, receiving transaction account identifier, currency code, etc. In step 314, the acquiring financial institution 110 may receive the transaction data for the electronic payment transaction.

In step 316, the acquiring financial institution 110 may generate an authorization request for the payment transaction, which may be transmitted to the payment network 112 using payment rails associated therewith. The authorization request may include the transaction data including the payment account number and the currency code that indicates that cryptocurrency is to be used for payment for the electronic payment transaction. The authorization request may also include data for the blockchain transaction, which may include a destination blockchain address, which may be generated by the point of sale device 108 (e.g., and transmitted in step 312) or the acquiring financial institution 110 using a public key of the blockchain wallet to be used to receive payment for the payment transaction. The authorization request may be forwarded to the issuing financial institution 104 by the payment network 112, and may be responded to by the issuing financial institution 104 with an authorization response, that is forwarded by the payment network 112 to the acquiring financial institution 110 and received, in step 318. The authorization response may include the transaction data as well as a response code indicating approval of the electronic payment transaction and a digital signature for the blockchain transaction generated using the issuing financial institution's private key for the consumer's blockchain wallet. In some cases, the authorization response may also include the full blockchain transaction, where the unspent transaction output(s) and any other destination addresses may have been added by the issuing financial institution 104.

In step 320, the acquiring financial institution 110 may submit the blockchain transaction with the first digital signature using the point of sale device 108, as well as any other data necessary for further processing of the payment transaction, such as a transaction identifier, the response code, an indication of approval of the transaction by the issuing financial institution 104, etc. In step 322, the point of sale device 108 may receive the blockchain transaction and first digital signature. In step 324, the point of sale device 108 may electronically transmit the blockchain transaction and first digital signature to the integrated circuit payment card 102 using the established communication channel.

In step 326, the receiving device 202 of the integrated circuit payment card 102 may receive the blockchain transaction and first digital signature from the point of sale device 108. In step 328, the validation module 218 of the integrated circuit payment card 102 may validate the first digital signature using a public key of the issuing financial institution's cryptographic key pair, such as may be stored in the memory 212 of the integrated circuit payment card 102 or an account profile 208 in the account database 206 of the integrated circuit payment card 102. In step 330, the generation module 216 of the integrated circuit payment card 102 may generate a second digital signature for the blockchain transaction using the private key of the integrated circuit payment card's cryptographic key pair, such as may be stored in the memory 212 or account profile 208. In step 332, the transmitting device 220 of the integrated circuit payment card 102 may electronically transmit the blockchain transaction with both digital signatures back to the point of sale device 108 using the established communication channel.

In step 334, the point of sale device 108 may receive the blockchain transaction and both digital signatures thereof. In step 336, the point of sale device 108 may forward the twice-signed blockchain transaction to the acquiring financial institution 110 using a suitable communication network and method, for receipt thereby, in step 338. In step 340, the acquiring financial institution 110 may submit the blockchain transaction with both digital signatures to a blockchain node 116 in the blockchain network 114. The blockchain transaction may be added to a pool of unconfirmed transactions for confirmation by blockchain nodes 116 and inclusion in a new block that may be generated, confirmed, and added to the blockchain of the blockchain network 114, which may effect the transfer of cryptocurrency for the electronic payment transaction from the multi-signature wallet of the consumer 106 to the merchant's blockchain wallet.

Exemplary Method for Carrying Out a Cryptocurrency Blockchain Transaction

Figure 4:
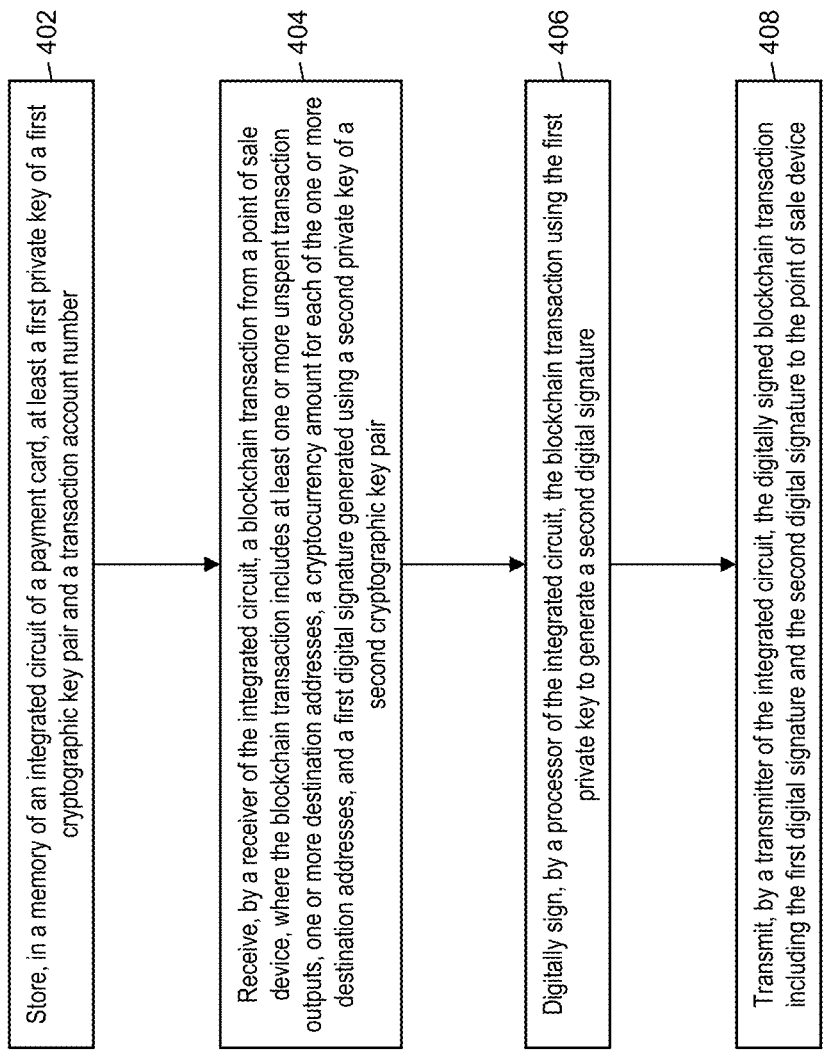
FIG. 4 is a flow chart illustrating an exemplary method for carrying out a cryptocurrency blockchain transaction through an integrated circuit payment card in accordance with exemplary embodiments.

FIG. 4 illustrates a method for carrying out a cryptocurrency blockchain transaction through an integrated circuit payment card using a multi-signature blockchain wallet.

In step 402, at least a first private key of a first cryptographic key pair and a transaction account number may be stored in a memory (e.g., memory 212) of an integrated circuit payment card (e.g., integrated circuit payment card 102). In step 404, a blockchain transaction may be received by a receiver (e.g., receiving device 202) of the integrated circuit payment card from a point of sale device (e.g., point of sale device 108), where the blockchain transaction includes at least one or more unspent transaction outputs, one or more destination addresses, a cryptocurrency amount for each of the one or more destination addresses, and a first digital signature generated using a second private key of a second cryptographic key pair. In step 406, the blockchain transaction may be digitally signed by a processor (e.g., generation module 216) of the integrated circuit payment card using the first private key to generate a second digital signature. In step 408, the digitally signed blockchain transaction including the first digital signature and the second digital signature may be electronically transmitted by a transmitter (e.g., transmitting device 220) of the integrated circuit payment card to the point of sale device.

In one embodiment, the method 400 may further include: receiving, by an acquiring financial institution (e.g., acquiring financial institution 110), the digitally signed blockchain transaction from the point of sale device; and transmitting, by the acquiring financial institution, the digitally signed blockchain transaction to a blockchain node (e.g., blockchain node 116) in a blockchain network (e.g., blockchain network 114). In some embodiments, the method 400 may also include: receiving, by the receiver of the integrated circuit, a transaction request from the point of sale device; and transmitting, by the transmitter of the integrated circuit, a response to the transaction request prior to receiving the blockchain transaction, wherein the response includes at least the transaction account number.

In one embodiment, the memory of the integrated circuit may further include a first public key of the first cryptographic key pair, and the transmission of the digitally signed blockchain transaction may further include the first public key. In a further embodiment, the method 400 may also include validating, by the point of sale device, the second digital signature using the first public key. In another further embodiment, the method 400 may further include validating, by an acquiring financial institution, the second digital signature using the first public key.

In some embodiments, the method 400 may also include validating, by the processor of the integrated circuit, the first digital signature using a second public key of the second cryptographic key pair prior to digitally signing the blockchain transaction. In a further embodiment, the memory may further include the second public key of the second cryptographic key pair.

Computer System Architecture

FIG. 5 illustrates a computer system 500 in which embodiments of the present disclosure, or portions thereof, may be implemented as computer-readable code. For example, the integrated circuit payment card 102, issuing financial institution 104, point of sale device 108, acquiring financial institution 110, and blockchain node 116 of FIG. 1 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A, 3B, and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A, 3B, and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for carrying out a cryptocurrency blockchain transaction through an integrated circuit payment card using a multi-signature blockchain wallet. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for carrying out a cryptocurrency blockchain transaction through an integrated circuit payment card using a multi-signature blockchain wallet stored in the integrated circuit payment card, comprising:

storing, in a memory of an integrated circuit of a payment card, at least a first private key of a first cryptographic key pair, a transaction account number, and a second public key of a second cryptographic key pair, the first cryptographic key pair associated with the multi-signature blockchain wallet and the second cryptographic key pair associated with an issuing financial institution;

receiving, by a receiver of the integrated circuit, transaction data from a point of sale device, the transaction data including a transaction amount and a transaction identifier;

transmitting, by a transmitter of the integrated circuit, the transaction account number to the point of sale device in response to the transaction data prior to generating a blockchain transaction;

receiving, by the receiver of the integrated circuit, blockchain data from the point of sale device via a communication channel, where the blockchain data includes at least one or more unspent transaction outputs associated with the payment card, one or more destination addresses associated with the point of sale device, a cryptocurrency amount for each of the one or more destination addresses, and a first digital signature generated by the issuing institution using a second private key of the second cryptographic key pair, the cryptocurrency amount being equivalent to the transaction amount in the transaction data, and the first digital signature generated in response to an authorization request from an acquiring financial institution linked to the point of sale device;

generating, by the integrated circuit, a blockchain transaction using the received blockchain data;

validating, by a processor of the integrated circuit, the first digital signature using the second public key of the second cryptographic key pair;
in response to validating the first digital signature, digitally signing, by the processor of the integrated circuit, the blockchain transaction using the first private key to generate a second digital signature; and
transmitting, by the transmitter of the integrated circuit, the digitally signed blockchain transaction including the first digital signature and the second digital signature to the point of sale device.

2. The method of claim 1, further comprising:
receiving, by an acquiring financial institution, the digitally signed blockchain transaction from the point of sale device; and
transmitting, by the acquiring financial institution, the digitally signed blockchain transaction to a blockchain node in a blockchain network.

3. The method of claim 1, wherein,
the memory of the integrated circuit further includes a first public key of the first cryptographic key pair, and
the transmission of the digitally signed blockchain transaction further includes the first public key.

4. The method of claim 3, further comprising:
validating, by the point of sale device, the second digital signature using the first public key.

5. The method of claim 3, further comprising:
validating, by an acquiring financial institution, the second digital signature using the first public key.

6. The method of claim 1, further comprising:
transmitting, by the point of sale device, the transaction account number to the issuing financial institution;
receiving, by the issuing financial institution, the transaction account number from the point of sale device;
identifying, by the issuing financial institution, an account profile using the transaction account number, the account profile including the one or more unspent transaction outputs; and
transmitting, by the issuing financial institution, the one or more unspent transaction outputs to the point of sale device.

7. A system for carrying out a cryptocurrency blockchain transaction through an integrated circuit payment card using a multi-signature blockchain wallet stored in the integrated circuit payment card, comprising:
a point of sale device; and
a payment card having an integrated circuit, wherein the integrated circuit includes:
a memory storing at least a first private key of a first cryptographic key pair, a transaction account number, and a second public key of a second cryptographic key pair, the first cryptographic key pair associated with the multi-signature blockchain wallet and the second cryptographic key pair associated with an issuing financial institution,
a receiver receiving transaction data from the point of sale device, the transaction data including a transaction amount and a transaction identifier,
a transmitter transmitting the transaction account number to the point of sale device in response to the transaction data prior to generating a blockchain transaction,
the receiver receiving blockchain data from the point of sale device via a communication channel, where the blockchain data includes at least one or more unspent transaction outputs associated with the payment card, one or more destination addresses associated with the point of sale device, a cryptocurrency amount for each of the one or more destination addresses, and a first digital signature generated by the issuing institution using a second private key of the second cryptographic key pair, the cryptocurrency amount being equivalent to the transaction amount in the transaction data, and the first digital signature generated in response to an authorization request from an acquiring financial institution linked to the point of sale device;
a processor generating a blockchain transaction using the received blockchain data;
the processor validating the first digital signature using the second public key of the second cryptographic key pair;
the processor, in response to validating the first digital signature, digitally signing the blockchain transaction using the first private key to generate a second digital signature, and
the transmitter transmitting the digitally signed blockchain transaction including the first digital signature and the second digital signature to the point of sale device.

8. The system of claim 7, further comprising:
a blockchain network including a blockchain node; and
an acquiring financial institution, wherein the acquiring financial institution
receives the digitally signed blockchain transaction from the point of sale device, and
transmits the digitally signed blockchain transaction to the blockchain node.

9. The system of claim 7, wherein,
the memory of the integrated circuit further includes a first public key of the first cryptographic key pair, and
the transmission of the digitally signed blockchain transaction further includes the first public key.

10. The system of claim 9, wherein the point of sale device validates the second digital signature using the first public key.

11. The system of claim 9, further comprising:
an acquiring financial institution validating the second digital signature using the first public key.

12. The system of claim 7, wherein the point of sale device includes a transmitter transmitting the transaction account number to the issuing financial institution; and
wherein the issuing financial institution includes:
a receiver receiving the transaction account number from the point of sale device;
a processor identifying an account profile using the transaction account number, the account profile including the one or more unspent transaction outputs, and
a transmitter transmitting the one or more unspent transaction outputs to the point of sale device.

13. A method for carrying out a cryptocurrency blockchain transaction through an integrated circuit payment card using a multi-signature blockchain wallet stored in the integrated circuit payment card, comprising:
detecting, by a processing device of a point of sale device, an integrated circuit payment card for payment of a blockchain transaction;
establishing, by the processing device of the point of sale device, a communication channel with the integrated circuit payment card;
transmitting, by the processing device of the point of sale device via the communication channel, transaction data from the point of sale device to the integrated circuit payment card, the transaction data including at least, a transaction amount, and a transaction identifier;

receiving, by the processing device of the point of sale device via the communication channel, a transaction account number from the integrated circuit payment card;

transmitting, by the processing device of the point of sale device via a payment network, payment transaction data to an acquiring financial institution prior to receiving a blockchain transaction, the payment transaction data including at least the transaction account number, and the transaction data;

receiving, by the processing device of the point of sale device via the payment network, blockchain data and a first digital signature of an issuing financial institution associated with the integrated circuit payment card from the acquiring financial institution, the blockchain data including one or more unspent transaction outputs associated with the integrated circuit payment card, one or more destination addresses associated with the point of sale device, and a cryptocurrency amount for each of the one or more destination addresses, the cryptocurrency amount being equivalent to the transaction amount in the transaction data, and the first digital signature generated by the issuing institution using a second private key of a second cryptographic key pair associated with the issuing financial institution;

transmitting, by the processing device of the point of sale device via the communication channel, the blockchain data and the first digital signature to the integrated circuit payment card;

receiving, by the processing device of the point of sale device via the communication channel, the blockchain transaction digitally signed with a second digital signature from the integrated circuit payment card, the second digital signature generated by the integrated circuit payment card using a first private key of a first cryptographic key pair associated with the multi-signature blockchain wallet in response to validating the first digital signature; and transmitting, by the processing device of the point of sale device via the payment network, the digitally signed blockchain transaction including the first digital signature and the second digital signature to the acquiring financial institution.

14. The method of claim 13, comprising:

receiving, by the acquiring financial institution via the payment network, the digitally signed blockchain transaction from the processing device; and transmitting, by the acquiring financial institution, the digitally signed blockchain transaction to a blockchain node in a blockchain network.

15. The method of claim 13, wherein, the blockchain transaction digitally signed with the second digital signature includes the first public key.

16. The method of claim 15, comprising:

validating, by the processing device of the point of sale device, the second digital signature using the first public key.

* * * * *